Figure 1:
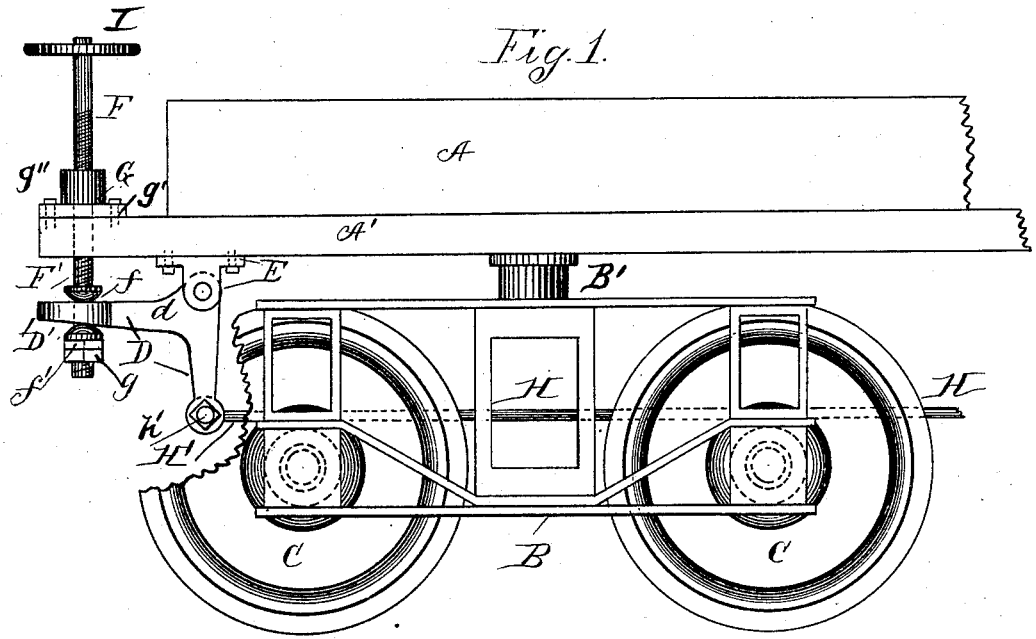

(No Model.)

J. M. HARBAUGH & P. J. RYAN.
CAR BRAKE.

No. 302,533. Patented July 22, 1884.

Witnesses:
John C. Miller
A. L. Keyser

John M. Harbaugh
Patrick J. Ryan
Inventors

W. T. Fitzgerald
Attorney.

UNITED STATES PATENT OFFICE.

JOHN M. HARBAUGH AND PATRICK J. RYAN, OF SOMERSET, OHIO.

CAR-BRAKE.

SPECIFICATION forming part of Letters Patent No. 302,533, dated July 22, 1884.

Application filed April 14, 1884. (No model.)

*To all whom it may concern:*

Be it known that we, JOHN M. HARBAUGH and PATRICK J. RYAN, citizens of the United States, residing at Somerset, in the county of Perry and State of Ohio, have invented certain new and useful Improvements in Car-Brakes; and we do hereby declare the following to be a full, clear, and exact description of the invention, such as will enable others skilled in the art to which it appertains to make and use the same.

The object of this improvement is a powerful and quick-acting car-brake of simple construction, specially adapted for use on freight-cars, but applicable to and intended for use on all kinds of railroad-cars. These results are attained by the mechanism illustrated in the drawings herewith filed as part hereof, in which the same letters of reference denote the same parts in both views.

Figure 2:
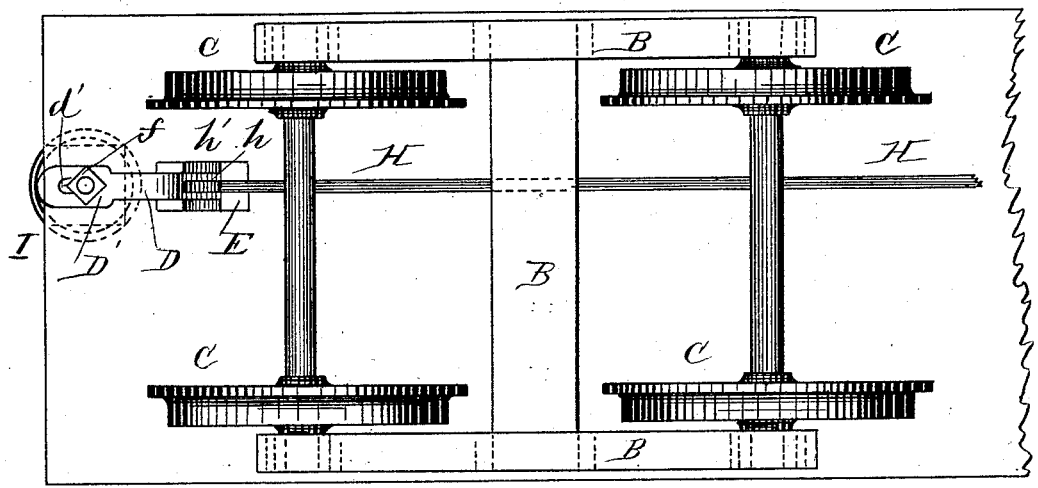

Figure 1 represents a section of a freight-car with our improved brake applied thereto. Fig. 2 is a view of the same inverted.

A A' is the car.

B B' is the truck.

C C are truck-wheels.

D is a bell-crank lever having an enlarged end, D', provided with a slot, as shown at $d'$ in Fig. 2, and pivoted at $d$ to a slotted bracket, E, affixed to the bottom of the car by any suitable means.

F F' is a screw-threaded rod having a convexed nut or shoulder, $f$, above the lever D, and a convex-faced nut, $f'$, with square sides below and adjoining the lever, rigidly secured in position by a lock-nut, $g$.

G is a sleeve provided with a screw-thread corresponding to the threaded rod E', and secured to the car-platform by means of the flange $g'$ and bolts or screws $g''$.

H H represent the brake-rod, connected by means of eye $h$ and bolt $h'$ with the bell-crank lever, and to the shoe-frame in the ordinary manner.

I is a wheel for operating the brake through the rod F F', turning which in the proper direction will cause the outer end of the bell-crank lever to rise, and the brake-shoes will thereby be drawn quickly against the car-wheels with great force, and the desired effect thus produced.

Having explained the construction and operation of our improvement, what we claim, and desire to secure by Letters Patent, is—

In a car-brake constructed as described, the combination of the screw-threaded sleeve G, the screw F, having convexed shoulder $f$, convexed nut $f'$, and the slotted bell-crank lever D D', substantially as specified, for the purpose set forth.

In testimony whereof we affix our signatures in presence of two witnesses.

JOHN M. HARBAUGH
PATRICK J. RYAN.

Witnesses:
M. A. CROSBIE,
R. F. MCGONAGLE.